Jan. 26, 1971  E. A. GRANFORS ET AL  3,559,162

UNITARY DIRECTIONAL SONAR TRANSDUCER

Filed April 14, 1969  2 Sheets-Sheet 1

INVENTORS
ERNEST A. GRANFORS
DON L. LOVELESS
CHARLES F. BOYLE

BY Beaman & Beaman

ATTORNEYS

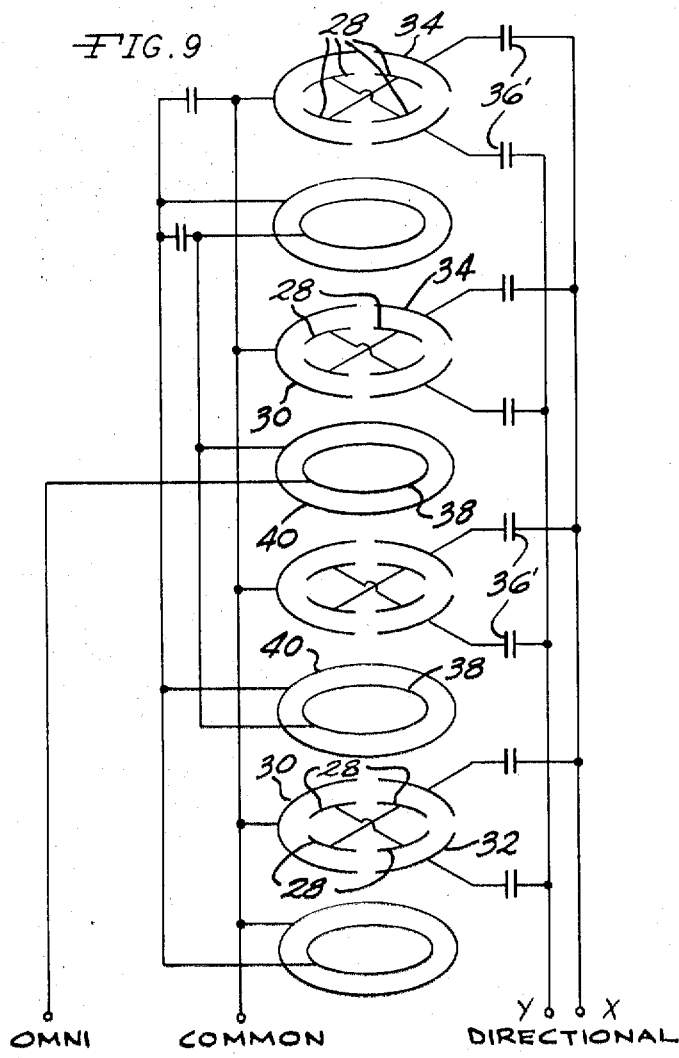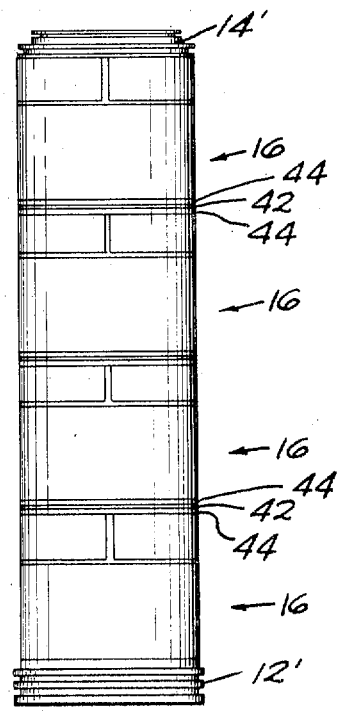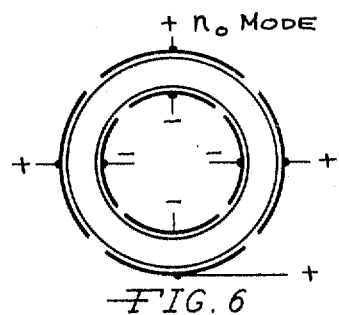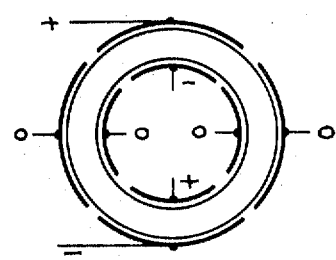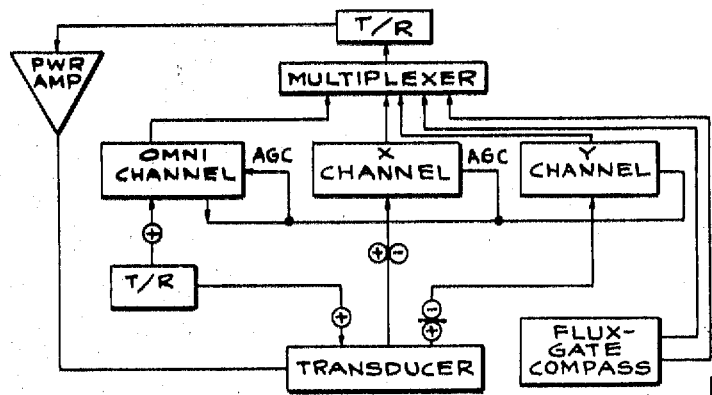

3,559,162
UNITARY DIRECTIONAL SONAR TRANSDUCER
Ernest A. Granfors, Don L. Loveless, and Charles F. Boyle, Jackson, Mich., assignors to Sparton Corporation, Jackson, Mich., a corporation of Ohio
Filed Apr. 14, 1969, Ser. No. 815,630
Int. Cl. H04r 1/32
U.S. Cl. 340—10
3 Claims

ABSTRACT OF THE DISCLOSURE

An underwater sonar transducer utilizing a unitary or homogeneous cylindrical piezoelectric ceramic element having two sets of electrodes fixed thereto at separate axial regions of the piezoelectric cylinder element. One set of electrodes produces orthogonal directional bearing related voltages, and the other set of electrodes produces omnidirectional bearing related voltages.

CROSS-REFERENCES TO RELATED APPLICATIONS

The instant application is an improvement upon the transducer disclosed in the assignee's Pat. No. 3,444,508 and claimed in U.S. application No. 810,616, filed Mar. 26, 1969, a division of the above patent.

BACKGROUND OF THE INVENTION

The invention pertains to the field of detecting the presence of bodies submerged in water by the use of acoustic characteristics. The invention is directed to a transducer capable of generating and receiving vibrations while submerged.

In sonar systems, i.e., underwater detection systems employing a propagated acoustic vibration for the purpose of observation, detection or communication, one of the prime concerns is that of separating information indicating the presence of the sought object from background or environmental "noise" produced by other sources than the object being sought. The effectiveness of sonar transducers is largely rated by the ability of the system, and transducer, to produce an acceptable signal-to-noise ratio. The signal would be the average signal power in watts measured over the time that the signal exists, and the noise is considered the average noise power in watts in the band of the sonar referring to the average power in the interfering background wave form. Generally, it is assumed that a signal may be detected on the average of fifty percent of the time in the presence of noise, if the signal-to-noise ratio exceeds a predetermined number commonly referred to as the recognition differential. If added selectivity in the form of directional horizontal and/or vertical receiving responses can be achieved, an improved signal-to-noise ratio is produced substantially improving the effectiveness of the transducer and system.

Previously, sonar systems, and conventional transducers, have not been able to effectively utilize the aforementioned characteristic in a transducer which is practical to manufacture both from a technical and an economic standpoint. The state of the prior art is represented by the U.S. Pats. 2,468,837; 3,321,738; 3,277,433 and 3,290,646.

The prior art transducer systems which both generate the signal, as well as receive the reflected signal, have been limited with respect to power output, which, therefore, limits the range and accuracy of the sonar system. Also, the cost of the prior art devices renders the use of directional sonar systems expensive, thereby limiting the use of the apparatus. Present day high search rate requirements require that a high sensitivity and high range detection be achieved. Additionally, high resolution is also expected and the transducer must be usable with fully automated signal analyzers and other equipment used to analyze and transmit the received signals.

The sonar system and transducer disclosed in Pat. No. 3,444,508, overcomes many of the disadvantages of the prior art systems. However, in that the orthogonal and omnidirectional bearing related voltages produced by the transducer are mounted upon separate and distinct piezoelectric cylinders acoustically isolated from each other, the manufacturing costs and characteristics are inferior to those pertaining to the transducer of the instant invention.

SUMMARY OF THE INVENTION

The basic purpose of the instant inventon is to provide an improved transducer construction capable of producing both orthogonal and omnidirectional bearing related voltages from a homogeneous piezoelectric cylinder.

In the practice of the invention the transducer voltages are produced within a common, unitary, piezoelectric cylinder for both orthogonal and omnidirectional purposes. Also, the transducer piezoelectric element is capable of producing the signal, as well as receiving the same when reflected from reflected bodies, such as the sought object.

The invention provides for integral transducer phasing and summing thereby directly providing for sine-cosine voltage outputs, which eliminates external circuits.

The transducer of the invention has a relatively broad frequency range having very high sensitivity between 6 kc. to 12 kc., and is particularly useful over the frequency range of 5 cycles to 12 kc. The homogeneous cylindrical element used in the transducer of the invention provides a high capacitance in a radially polarized piezoelectric element as to produce improved directional sensitivity characteristics.

With respect to a transducer constructed in accord with the disclosure of the above identified applications, the unitary piezoelectric cylinder element of the invention, upon which both orthogonal directional and omnidirectional electrodes are mounted, has the advantage of being less complicated from a mechanical point of view, lowering manufacturing costs, as well as lowering the cost of assembly of the transducer. Additionally, an improved uniformity of responses between the omnidirectional and directional modes is achieved. The use of the unitary piezoelectric cylinder reduces the space required for a transducer utilizing the invention, and the number of acoustic isolators required are one-half those required with the transducer previously disclosed in the above applications.

The use of the unitary cylinder permits an optimum allocation of ceramic material between the directional and omnidirectional electrodes and a maximum transmitting system can be achieved without sacrificing receiving voltage sensitivity in either the omnidirectional or directional modes.

BRIEF DESCRIPTION OF THE DRAWINGS

The aforementioned objects of the invention will be appreciated from the following description and accompanying drawings wherein:

FIG. 6 illustrates, in a schematic form, the relationship of the components of the element, and the potentials created during the $N_0$ mode of vibration, FIG. 7 illustrates voltages created by the directional electrodes in the $N_1$ mode of excitation, FIG. 8 is an elevational view of a transducer constructed in accord with the invention using a plurality of stacked cylindrical elements to define an array, FIG. 9 illustrates the electrical circuit of the transducer arrangement of FIG. 8, and FIG. 10 is a block diagram illustrating the electronic components directly utilized with the transducer which would be associated with the transducer well below the surface of the water.

DESCRIPTION OF THE PREFERRED EMBODIMENTS

The transducer of the invention finds particular use in sonar systems used to detect submarines and other underwater objects, and the apparatus associated with the transducer for transmitting and producing the signals received by, and transmitted by, the transducer may be of a conventional nature. Usually, the transducer is suspended from a support floating on the surface of the water, and by means of a cable, the transducer components suspend therefrom.

Figure 1:
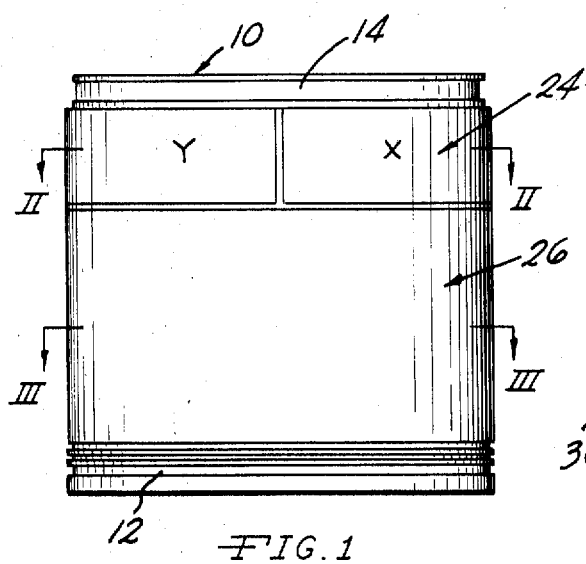
FIG. 1 is an elevational view of a complete transducer element constructed in accord with the invention.
Figure 2:
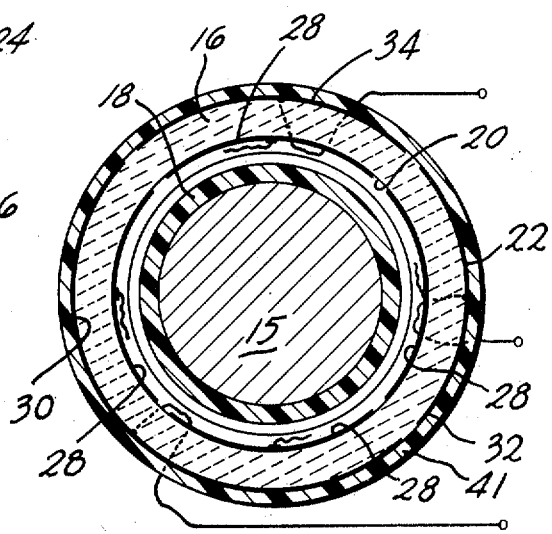
FIG. 2 is a cross sectional view taken through the orthogonal directional portion of the piezoelectric element along Section II—II of FIG. 1.

In FIG. 1 the basic configuration of a transducer assembly in accord with the invention is illustrated wherein only a single piezoelectric cylinder is employed. The transducer includes a support member 10, having a lower flange portion 12 and upper flange portion 14 interconnected by a portion 15 passing through the piezoelectric cylinder element 16. The remainder of the subsurface transducer assembly, such as that housing the battery and electronic components, is usually attached to the upper flange 14 of the supporting portion 10.

The piezoelectric ceramic cylinder 16 may be formed of any of several piezoelectric materials, such as lead zirconate-lead titanate. PZT ceramics as manufactured by Clevite Corporation, Bedford, Ohio, have been found particularly useful, and other materials that may be employed are ADP, lithium sulphate, or other polycrystalline materials.

The piezoelectric ceramic cylinder element 16 is mounted upon the supporting member 10 such that an annular air gap exists between the inner cylindrical surface of the cylinder element and a Delrin spacer sleeve 18 circumscribing the support portion 15.

The cylindrical piezoelectric element 16 includes inner and outer cylindrical wall surfaces 20 and 22, respectively, and also includes an axial end region 24 and an axial end region 26. For purpose of definition the axial regions of the element are designated end regions, and these end regions can be considered to extend away from the ends of the element 16 a distance equal to the axial dimension of the sets of electrodes defined thereon, as will be later described.

Two sets of electrodes are affixed to the ceramic element 16, one set constituting the electrodes for producing the orthogonal directional voltages, while the other set of electrodes produces the omnidirectional voltages. The electrodes are formed by silverplating specified portions of the element inner and outer surfaces, and sufficient spacing exists between the various electrode portions to define an electrical insulation between the various electrodes due to the dielectric nature of the ceramic element.

The position of the set of electrodes on the ceramic element end region 24 for producing the orthogonal directional voltages is best appreciated from FIGS. 1, 2, 6 and 7. Upon the inner surface 20 at the end region 24, four silver electrodes 28 are plated at 90° intervals. These electrodes 28 are of similar circumferential and axial dimension, and are disposed in diametrically opposed relationship to each other. Terminals are defined upon the electrodes and diametrically opposed electrodes are connected together as will be apparent from FIG. 4.

Figure 4:
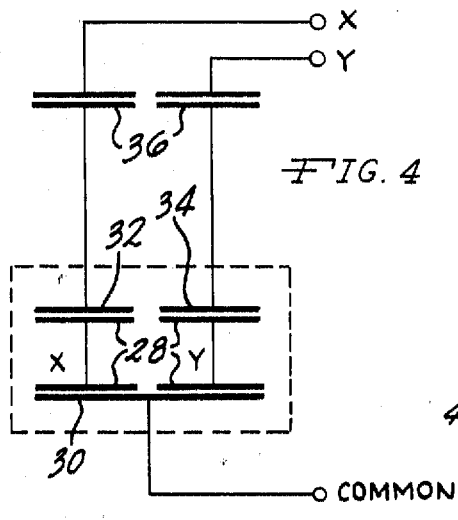
FIG. 4 is a view illustrating the circuit and electrode interconnection of the directional portion of the piezoelectric cylinder element.

In radially opposed relation to the electrodes 28, three electrodes 30, 32 and 34 are defined upon the outer surface 22 of the element end region 24. Electrode 30 encompasses approximately 180° of the outer circumference of the element end region surface and is in radial alignment with two of the electrodes 28. The electrodes 32 and 34 encompass 90° of the outer wall surface, and are in radial alignment with the electrodes 28 not aligning with the electrode 30. Conductors are electrically connected to the electrodes as shown. The electrical interconnection of the electrodes is indicated in FIG. 4, and shading capacitors 36 are employed in the circuits of the X and Y axes in order to control the sensitivity of the transducer and obtain the desired directional pattern. These shading capacitors may consist of metalized Mylar.

Figure 5:
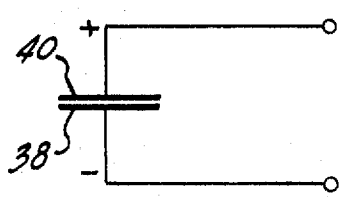
FIG. 5 is a view of the circuit utilized in the omnidirectional portion of the cylindrical element.
Figure 3:
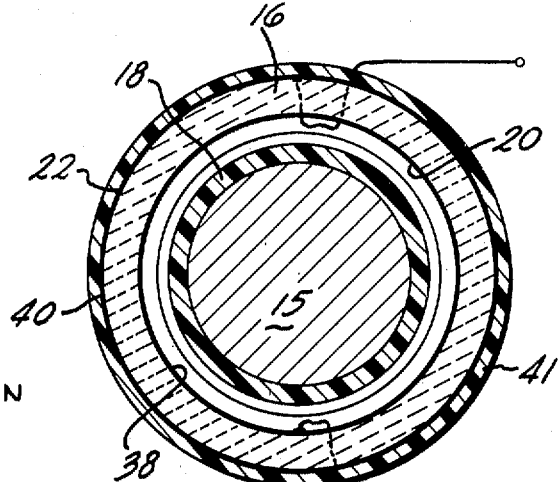
FIG. 3 is a cross sectional view taken along Section III—III of FIG. 1.

The omnidirectional electrodes consist of the silverplated portion 38, disposed upon the inner surface of the element 16 in end region 26, and in axially aligned relationship, the outer electrode 40 circumscribes the outer end region 26 of the element 16. From FIG. 1, it will be appreciated that the axial dimension of the omnidirectional electrodes is significantly greater than the axial dimension of the orthogonal directional electrodes. Conductors are affixed to the inner and to the outer omnidirectional electrodes, as shown. The wiring diagram for the omnidirectional electrodes is illustrated in FIG. 5.

The entire cylindrical element 16 is preferably encased within a protective coating 41, such as of Neoprene, in order to protect the transducer from damage, and other adverse influences.

The directional properties of the cylindrical transducer element result from the fact that a right circular cylinder has several mechanical modes of resonance. In the case of a segmented cylinder, such as results from the location of the electrodes upon the element 16, the output is the sum of two voltages, both of which are the result of vibration in the two principal modes of the cylinder. When a pressure wave passes the element, radial expansions and contractions occur. If all of the stresses and voltages developed are in phase, the transducer is vibrating in the $N_0$ as represented in FIG. 6. This mode of vibration is that which causes the cylinder to radially expand and contract in circumference wherein the diameter of the cylinder is increasing and decreasing throughout its configuration. Of course, these dimensional changes are very small, but the sensitive characteristics of the piezoelectric cylinder produces a voltage which can be sensed and utilized.

Unless suppressed, the cylinder will resonate in several modes simultaneously. The modes of vibration are aligned tangentially to the equal pressure plane of the sound wave perpendicular to the sound source. Thus, for $n=1$ the cylinder will vibrate as a dipole, FIG. 7, essentially yielding a cosine directivity pattern. The transducer has many resonant modes which have the following frequency relationship:

$$f_R = \frac{C}{MD}\sqrt{1+n^2}$$

where:

$f_R$=Resonant frequency.
D=Diameter of cylinder.
C=Sound velocity within the material.
$n$=Mode of vibration.

In $n_1$ mode the cylinder expands as semicylindrical portions expand and contract, and the potentials will be as indicated in FIG. 7. When the cylinder is stressed in the $n_1$ mode the upper half of the cylinder is stressed in one radial direction while the lower half is stressed in the opposite radial direction. At points midway between the two halves the tangential stress is maximum while the radial component is zero. Because the cylindrical element 16 is sensitive only to radial stressing, a voltage will not be developed at the nodes, as illustrated in FIG. 7. While absolute pressure activates the $n_0$ mode, the pressure gradient is the motivating influence of the $n_1$ mode. The pressure gradient of a sonic wave is 90° out of phase with the absolute pressure of that wave. Therefore, the voltage developed due to the $n_1$ mode is 90° out of phase with the voltage developed by the stresses of the $n_0$ mode.

The output of the transducer element 16 is the sum of the $n_0$ and $n_1$ voltages. To separate the two voltages to obtain the signal developed in the $n_1$ mode, the outputs of the two opposite elements must be subtracted. The voltage produced in the $n_0$ mode is equal in amplitude and phase. Thus, there will be not difference and no output due to vibration in this particular mode.

In order to produce improved sensitivity and transmitting characteristics the preferred construction of a transducer utilizing the inventive concepts employs a plurality of cylindrical elements 16. Such a construction is shown in FIG. 8. In FIG. 8 a plurality of stacked elements 16 are shown supported between flange supporting members 12' and 14' wherein the supporting arrangement of the embodiment of FIG. 8 is similar to that of FIG. 1. The elements 16 are separated at their adjacent ends by suitable acoustic isolation means. This isolation means may be in the form of a Delrin spacer 42 sandwiched between synthetic cork shims 44 which provide the desired cushioning and sealing.

The elements of the array of FIG. 8 are electrically interconnected as represented in FIG. 9. The directional electrodes 28–34 are connected in parallel through shading capacitors 36', and the omnidirectional electrodes 38 and 40 are also connected in parallel, as illustrated.

By using four equally spaced electrodes 28 in the orthogonal directional set of electrodes, it is possible to combine the voltage outputs as indicated to provide for two separate channels yielding sine/closine patterns, spatially at right angles to each other.

By utilizing radial polarization a significant increase in the capacity and sensitivity of the piezoelectric cylindrical element is realized. By poling through the cylinder wall thickness the opportunity of damaging the element is minimized while a uniform potential gradient during the poling is achieved. By the use of thin wall elements the invention realizes high capacitance values, and electrical uniformity can be easily maintained without employing expensive manufacturing techniques.

FIG. 10 illustrates, in block form, the interconnection of the transducer with those components directly associated therewith. The T/R relay receives the desired address tone combination from the surface unit to permit the transmit condition. The signal passes through the T/R relay where it is amplified and applied to the omnidirectional sections of the transducer through another T/R relay. The water surrounding the transducer is ensonified by the sonar pulse. When the sonic cylinder from the command transmitter drops out, the T/R relays revert to their receiving mode. The incoming signals is sensed in three different ways by the transducer. The output level and the relative polarity of each of three transducer sections are related in accordance with the direction from which the acoustic signal arrives. Since the incident pressure wave is in the same relative phase for all three sections, the output relationships then, are dependent upon the transducer characteristics. The acoustic receiving patterns are shown at the transducer in the lower portion of FIG. 10; one being omnidirectional and is labeled "+" as a convenience in showing relative phase at an instant when the received pressure is at a positive peak. The others are sine-cosine dipole patterns which have the characteristic of output level variation with bearing. As bearing varies, the output signal phase changes alternately from an in-phase "+" to phase operation "−" as the output diminishes, passes through zero and again increases.

The omni output, having constant level and phase regardless of bearing, provides an amplitude and phase reference for comparing the amplitude and polarities of the two bearing-sensitive signals. Because the dipole responses are spatially orthogonal, the information inherent in the three signals is sufficient to deduce bearing. These three signals and compass information are the primary inputs. Compass and sonic information from the three channels are multiplexed where transmission is presented to a VHF transmitter.

A flux gate compass has been found particularly useful to provide the bearing reference to magnetic north. This operates on a magentic core saturation principle and utilizes a common core with torodial winding to achieve greater uniformity between reactors. It permits direct transmittal of the output signals eliminating the need to translate the output frequencies to conserve multiplexing signal bandwidth.

By mounting the omnidirectional and orthogonal directional electrodes upon a common cylindrical ceramic element, improved uniformity of response is achieved as compared with a transducer wherein separate cylindrical elements are used for the omnidirectional and orthogonal directional electrodes due to the homogeneous construction and uniting of the electrodes upon a common cylinder.

It is appreciated that modifications to the inventive concept may be apparent to those skilled in the art without departing from the spirit and scope thereof and it is intended that the invention be defined only by the scope of the following claims.

What is claimed is:

1. An acoustically sensitive directional transducer comprising, in combination, a tubular, homogeneous, cylindrical piezoelectric element having radially polarized walls and ends, axially extending end regions defined on the inner and outer cylindrical wall surfaces of said element adjacent said ends, a first set of electrodes affixed to one of said end regions and a second set of electrodes affixed to the other of said end regions, said electrodes of a set being electrically insulated from each other and said sets being electrically insulated from each other and conductors connected to said electrodes, said first set providing orthogonal directional bearing related voltages and said second set providing omnidirectional bearing related voltages, said first set of electrodes comprising a plurality of electrodes affixed to said inner wall surface of said one end region and a plurality of electrodes affixed to the outer wall surface of said one end region, and said second set of electrodes comprising a first annular electrode affixed to the inner wall surface of said other end region and a second annular electrode affixed to said outer wall surface of said other end region in axial alignment with said first annular electrode.

2. In a transducer as in claim 1 wherein said first set of electrodes comprise four electrodes of equal circumferential and axial dimension affixed upon said inner wall surface of said one end region at 90° locations thereon, and three electrodes affixed upon said outer wall surface of said one end region in axial alignment with said four electrodes.

3. In a transducer as in claim 2 wherein diametrically opposed pairs of said four electrodes affixed upon said inner wall surfaces are electrically interconnected, and one of said three electrodes affixed upon said outer wall surface is in radically opposed relation to two of the electrodes affixed upon said inner wall surface and the other two of said electrodes affixed upon said outer wall surface are each in radial alignment with an electrode affixed upon said inner wall surface.

References Cited

UNITED STATES PATENTS

| 2,795,709 | 6/1957 | Camp. | |
| 2,928,069 | 3/1960 | Petermann | 340—10 |
| 3,176,262 | 3/1965 | Ehrlich et al. | 340—3 |
| 3,177,382 | 4/1965 | Green | 340—10X |

RODNEY D. BENNETT, Primary Examiner

B. L. RIBANDO, Assistant Examiner

U.S. Cl. X.R.

340—6